United States Patent
Shi et al.

(10) Patent No.: US 12,267,828 B2
(45) Date of Patent: Apr. 1, 2025

(54) CONFIGURATION METHOD AND APPARATUS FOR SCHEDULING PRIMARY CELL, AND DEVICE AND STORAGE MEDIUM

(71) Applicant: ZTE CORPORATION, Shenzhen (CN)

(72) Inventors: Jing Shi, Shenzhen (CN); Peng Hao, Shenzhen (CN); Xingguang Wei, Shenzhen (CN); Xing Liu, Shenzhen (CN); Kai Xiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 355 days.

(21) Appl. No.: 17/799,594

(22) PCT Filed: Feb. 4, 2021

(86) PCT No.: PCT/CN2021/075190
§ 371 (c)(1),
(2) Date: Aug. 12, 2022

(87) PCT Pub. No.: WO2021/160011
PCT Pub. Date: Aug. 19, 2021

(65) Prior Publication Data
US 2023/0084554 A1  Mar. 16, 2023

(30) Foreign Application Priority Data
Feb. 12, 2020 (CN) .......................... 202010089243.2

(51) Int. Cl.
*H04W 72/12* (2023.01)
*H04W 72/0453* (2023.01)

(52) U.S. Cl.
CPC ... *H04W 72/1215* (2013.01); *H04W 72/0453* (2013.01)

(58) Field of Classification Search
CPC ...................... H04W 72/1215; H04W 72/0453
See application file for complete search history.

(56) References Cited

U.S. PATENT DOCUMENTS 9,420,572 B2    8/2016  Lee et al.
2016/0135143 A1*  5/2016  Won ................... H04W 52/243
                                                                370/312

(Continued)

FOREIGN PATENT DOCUMENTS

CN    105991263 A    10/2016
CN    110662228 A    1/2020

(Continued)

OTHER PUBLICATIONS

3GPP, "NR; Radio Resource Control (RRC) protocol specification", 3GPP TS 38.331 V15.7.0, (Sep. 2019), 527 pages.

(Continued)

*Primary Examiner* — Chi H Pham
*Assistant Examiner* — Weibin Huang
(74) *Attorney, Agent, or Firm* — Morgan, Lewis & Bockius LLP

(57) ABSTRACT

Provided are a configuration method for scheduling a primary cell, a configuration apparatus for scheduling a primary cell, a device and a storage medium. The configuration method for scheduling a primary cell includes: configuring cross-carrier scheduling configuration information of a cell, such that a primary cell supports self-scheduling and being cross-carrier scheduled.

15 Claims, 1 Drawing Sheet

(56) References Cited

U.S. PATENT DOCUMENTS

| | | | |
|---|---|---|---|
| 2017/0141833 A1* | 5/2017 | Kim | H04B 7/0626 |
| 2018/0167957 A1 | 6/2018 | Noh et al. | |
| 2019/0313324 A1* | 10/2019 | Dalsgaard | H04W 24/10 |
| 2021/0037551 A1* | 2/2021 | Khoshnevisan | H04L 5/0044 |
| 2022/0330285 A1* | 10/2022 | Zhou | H04W 72/1263 |
| 2022/0377779 A1* | 11/2022 | Ji | H04L 5/0044 |

FOREIGN PATENT DOCUMENTS

| | | |
|---|---|---|
| CN | 111901869 A | 11/2020 |
| WO | WO2016/119882 A1 | 8/2016 |

OTHER PUBLICATIONS

Ericsson Moderator, "Summary of Rel-17 email discussion of NR dynamic spectrum sharing", 3GPP TSG-RAN Meeting #86 RP-192677, Sitges, Spain, Dec. 9-12, 2019, 5 pages.

Huawei et al., "NR CA enhancements and DSS", 3GPP TSG RAN Meeting #86 RP-192797, Sitges, Spain, Dec. 9-12, 2019, 2 pages.

Ericsson, "New WID on NR Dynamic Spectrum Sharing (DDS)", 3GPP TSG RAN Meeting #86 RP-193260, Sitges, Spain, Dec. 9-12, 2019, 17 pages.

International Search Report for Application No. PCT/CN2021/075190, dated Apr. 7, 2021, 6 pages (including translation).

Extended European Search Report for Application No. 21753012.0, dated Feb. 27, 2024, 10 pages.

First Search Report in European Application No. 2020100892432, dated Aug. 16, 2024, 8 pages, including translation.

First Office Action in Chinese Application No. 202010089243.2 dated Aug. 20, 2024, 24 pages, including translation.

Ericsson, "Dynamic spectrum sharing in Rel-17", 3GPP TSG RAN Meeting #84, RP-191052, Newport Beach, CA, USA, Jun. 3-6, 2019.

* cited by examiner

Configure cross-carrier scheduling configuration information of a cell, such that the primary cell supports self-scheduling and being cross-carrier scheduled — S110
FIG. 1
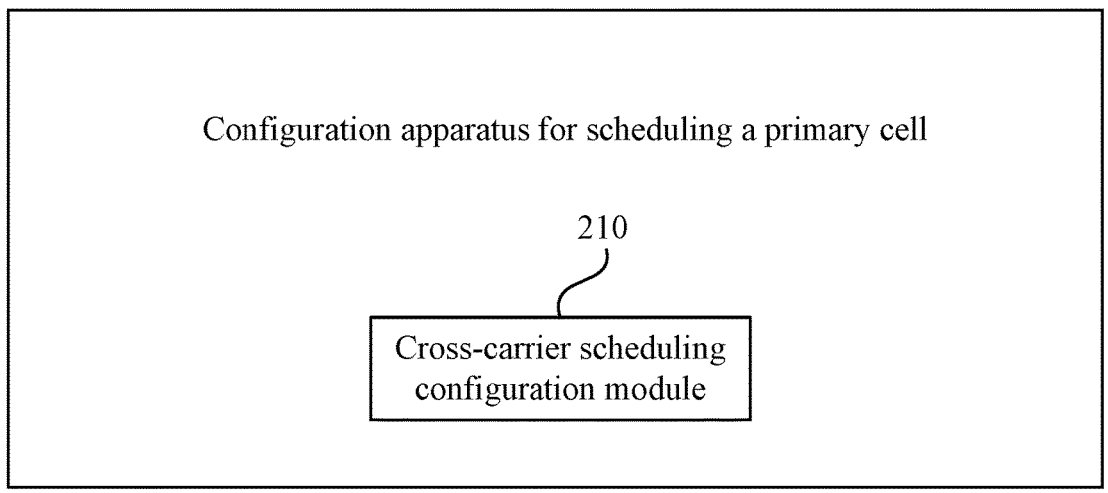
FIG. 2
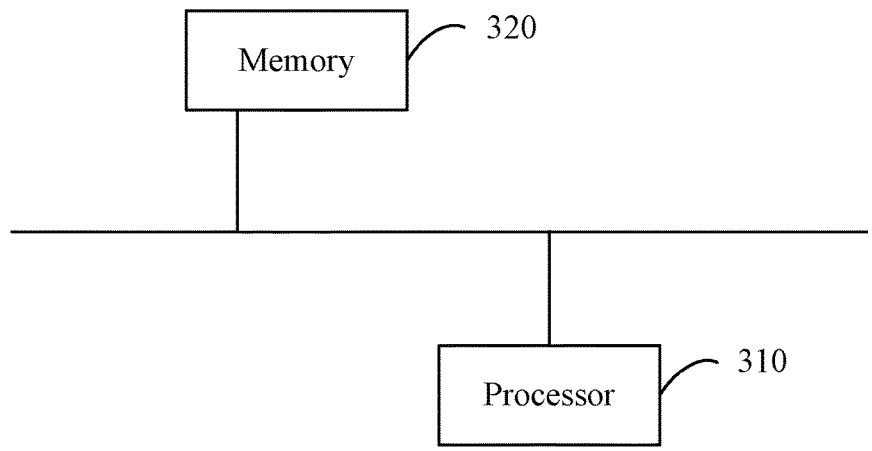
FIG. 3

CONFIGURATION METHOD AND APPARATUS FOR SCHEDULING PRIMARY CELL, AND DEVICE AND STORAGE MEDIUM

CROSS REFERENCE TO RELATED APPLICATIONS

This is a national stage application filed under 37 U.S.C. 371 based on International Patent Application No. PCT/CN2021/075190, filed Feb. 4, 2021, which claims priority to Chinese Patent Application No. 202010089243.2, filed on Feb. 12, 2020, the disclosures of which are incorporated herein by reference in their entireties.

FIELD

The present disclosure relates to the field of wireless communication networks and, for example, relates to a configuration method for scheduling a primary cell, a configuration apparatus for scheduling a primary cell, a device, and a storage medium.

BACKGROUND

In a 5G communication system, a primary cell (PCell) can schedule a secondary cell (SCell), however an SCell cannot schedule a PCell. Considering that Dynamic Power Sharing (DSS) is performed in either a 5G system and a 4G system, due to a bandwidth of the 4G system being relatively narrow and avoiding being interfered with by Physical Downlink Control Channel (PDCCH), Cell Reference Signal (CRS) or other factors in the 4G system, PDCCH resources on a PCell using DSS in the 5G system are restricted.

SUMMARY

The present disclosure provides a configuration method for scheduling a primary cell, a configuration apparatus for scheduling a primary cell, a device, and a storage medium, so that the primary cell supports self-scheduling and being cross-carrier scheduled.

Embodiments of the present disclosure provide a configuration method for scheduling a primary cell, including: configuring cross-carrier scheduling configuration information of a cell, such that the primary cell supports self-scheduling and being cross-carrier scheduled by a SCell.

Embodiments of the present disclosure provide a configuration apparatus for scheduling a primary cell, including: a cross-carrier scheduling configuration module, which is configured to configure cross-carrier scheduling configuration information of a cell, such that the primary cell supports self-scheduling and being cross-carrier scheduled by a SCell.

Embodiments of the present disclosure provide a device, including: a memory and one or more than one processor; where the memory is configured to store one or more programs; and the one or more than one processor, when executing the one or more programs, performs the configuration method for scheduling a primary cell according to any embodiment of the present disclosure.

Embodiments of the present disclosure provide a non-transitory computer-readable storage medium, and the storage medium stores computer programs, where the computer programs, when executed by a processor, perform the configuration method for scheduling a primary cell according to any embodiment of the present disclosure.

According to embodiments of the present disclosure, cross-carrier scheduling configuration information of a cell is configured, such that a primary cell supports self-scheduling and being cross-carrier scheduled by a SCell, and that a SCell scheduling the primary cell is realized and the demand for control resources of the primary cell can be reduced.

BRIEF DESCRIPTION OF DRAWINGS

FIG. 1 is a flowchart of a configuration method for scheduling a primary cell in an embodiment of the present disclosure;

FIG. 2 is a structure diagram of a configuration apparatus for scheduling a primary cell in an embodiment of the present disclosure; and FIG. 3 is a structure diagram of a device in an embodiment of the present disclosure.

DETAILED DESCRIPTION

Hereinafter, embodiments of the present disclosure will be described in conjunction with the accompanying drawings.

The 4th Generation mobile communication technology (4G) Long-Term Evolution (LTE)/Long-Term Evolution Advance (LTE-Advance/LTE-A) and the 5th Generation mobile communication technology (5G) face more and more demands. From the perspective of development trends, in both 4G and 5G systems, features that support enhanced mobile broadband, ultra-high reliability, ultra-low latency transmission, or massive connections are researched. Further, the 5G system is allowed to use 4G spectrums through DSS.

In 5G systems and standards, a cell is configured to perform self-scheduling or be cross-carrier scheduled through Radio Resource Control (RRC). Self-scheduling refers to receiving downlink control information (DCI) on a current carrier and scheduling a Physical Downlink Shared Channel (PDSCH) or a Physical Uplink Shared Channel (PUSCH) on the current carrier. Being cross-carrier scheduled refers to receiving DCI on another carrier other than a current carrier and scheduling a PDSCH or a PUSCH on the current carrier. When a cell (referred to as a cell C) is configured to as being cross-carrier scheduled through RRC, a cell index for scheduling the cell C (indicates which cell schedules the cell C) is needed to be configured through RRC and a carrier indicator field (CIF) value of the cell C used in a scheduling cell is also needed to be configured through RRC. If a CIF in DCI on a primary cell indicates the CIF value of the cell C used in a scheduling cell, this DCI schedules a PDSCH or a PUSCH on the cell C. Being cross-carrier scheduled is configured through an RRC element of cross-carrier scheduling configuration information CrossCarrierSchedulingConfig. A cell index of a scheduling cell is configured through schedulingCellId in the element of CrossCarrierSchedulingConfig, and the CIF value of a cell used in a scheduling cell is configured through cif-InSchedulingCell in the element of CrossCarrierSchedulingConfig. Assuming that RRC configures the cell C to be cross-carrier scheduled by the cell A and configures the CIF value of the cell C used in a scheduling cell to be 1, if the CIF value indicated by the CIF of DCI on the cell A is 1, this DCI schedules a PDSCH or a PUSCH on the cell C. The CIF cannot be configured in DCI format 1_0 or DCI format 0_0 (which are also referred to as fallback DCI), thus DCI format 1_0 and DCI format 0_0 can only be used for self-scheduling but not for being cross-carrier scheduled. The CIF can be configured in DCI format 0_1, DCI format 0_2, DCI format 1_1, and DCI format 1_2 (which are also referred to as non-fallback DCI), which means these DCI formats can be used for being cross-carrier scheduled.

When RRC configures a cell as self-scheduling, DCI format 1_0 can only be used to schedule a PDSCH on this carrier, DCI format 0_0 can only be used to schedule a PUSCH on the cell, DCI format 1_1 with CIF=0 and DCI format 1_2 with CIF=0 are used to schedule a PDSCH on this carrier, and DCI format 0_1 with CIF=0 and DCI format 0_2 with CIF=0 are used to schedule a PUSCH on this carrier. When RRC configures a cell as being cross-carrier scheduled, as well as that a CIF of DCI (DCI format 0_1, DCI format 0_2, DCI format 1_1 and DCI format 1_2) on a scheduling cell indicating the CIF value which is configured for the cell used in the scheduling cell, it means that the cell is cross-carrier scheduled, and one CIF value can only correspond to one cell. One cell can only be configured as self-scheduling or as being cross-carrier scheduled, and cannot be configured as self-scheduling and being cross-carrier scheduled at the same time. A primary cell can only be configured as self-scheduling, which causes that the PDCCH capacity is restricted during DSS, resulting in that control signaling in the 5G system is transmitted with a high load.

Primary cells (PCells) seen by different user equipments (UEs) may be different, and each carrier is independently configured for different UEs, so that a PCell in the embodiments of the present disclosure refers to a PCell seen by a same terminal.

The embodiments of the present disclosure are described for a PCell, however in a case where a secondary cell group (SCG) is configured, a primary secondary cell (PSCell) may perform in a same manner as the PCell described in the embodiments of the present disclosure. The manner for configuring cross-carrier scheduling configuration information of a primary cell in the embodiments of the present disclosure is applicable for either a PCell or a PSCell.

In a case where RRC configures a cell (referred to as a cell B) as self-scheduling, when RRC configures CrossCarrierSchedulingConfig, RRC configures the scheduling cell information schedulingCellInfo for the cell B as "own", i.e., self-scheduling. Whether a CIF exists in non-fallback DCI is configured through cif-Presence. When the cif-Presence is configured as "true", a bit field of CIF exists, and CIF=0 indicates self-scheduling, that is, the cell B is scheduled. Other CIF values indicate scheduling other carriers. When the cif-Presence is configured as "false", no CIF exists, and in this case, only self-scheduling can be performed.

In a case where RRC configures a cell (referred to as a cell C) as being cross-carrier scheduled, when RRC configures CrossCarrierSchedulingConfig, RRC configures the scheduling cell information schedulingCellInfo for the cell C as "other", i.e., being cross-carrier scheduled. The cell index of a cell A for scheduling the cell C is configured, that is, the cell index for scheduling the cell A is determined by configuring ServCellIndex corresponding to schedulingCellId. For a PCell, ServCellIndex=0, and for other cells, carrier indexes thereof are also configured through high-level signaling. The CIF value of the cell C used in a scheduling cell is configured. For example, the CIF value cif-InSchedulingCell is a positive integer ranged from 1 to 7. Assuming that RRC configures the cell C to be cross-carrier scheduled by the cell A and the CIF value of the cell C in a scheduling cell is configured as 1, in a case where the CIF of a DCI on the cell A indicates that a CIF value is 1, the DCI schedules a PDSCH or a PUSCH on the cell C.

In the related art, scheduling cell information of a cell being an SCell can only be configured as "other"; while, for a cell being a non-PCell, scheduling cell information thereof can be configured as "own" or "other".

In an embodiment of the present disclosure, FIG. 1 shows a flowchart of a configuration method for scheduling a primary cell, and the method includes the following operation S110.

In operation S110, cross-carrier scheduling configuration information of a cell is configured, such that the primary cell supports self-scheduling and being cross-carrier scheduled by a SCell.

In the related art, the scheduling cell information of a primary cell can only be configured as "own", i.e., self-scheduling, that is, the primary cell is configured as a scheduling cell. In order to realize that a primary cell supports self-scheduling and being cross-carrier scheduled, cross-carrier scheduling configuration information of the cell being the primary cell may be configured so that the primary cell can be configured to support being cross-carrier scheduled on the basis of supporting self-scheduling originally. Moreover, cross-carrier scheduling configuration information of the cell being a SCell may be configured so that the SCell can schedule the primary cell.

In an implementation, in a case where the cell is the primary cell, the scheduling cell information of the primary cell is configured as being cross-carrier scheduled, that is, the primary cell is configured as a scheduled cell; and the cell index of the SCell for scheduling the primary cell and the carrier indicator field (CIF) value of the primary cell used in the SCell are configured.

In a carrier aggregation (CA) scenario, in a case where RRC configures CrossCarrierSchedulingConfig for a PCell (referred to as a cell C, with a cell index as ServCellIndex=0), the scheduling cell information schedulingCellInfo of the cell C is configured as "other", i.e., being cross-carrier scheduled. In this case, the cell index of the scheduling cell A (called a scheduling cell) of the cell C (called a scheduled cell) is configured. In this case, the scheduling cell A is an SCell, that is, the cell index of the scheduling cell A is determined by configuring ServCellIndex corresponding to schedulingCellId. The ServCellIndex of the scheduling cell A is greater than 0, and may be an integer ranged from 1 to 31, for example, ServCellIndex=3. The CIF value of the cell C used in the scheduling cell A is configured, and the CIF value cif-InSchedulingCell may be a positive integer ranged from 1 to 7, for example, CIF=1.

In this case, the primary cell is capable of self-scheduling. Optionally, the primary cell being capable of self-scheduling includes: the primary cell is capable of self-scheduling and no CIF exists; or, the primary cell is capable of self-scheduling, and whether a CIF exists is configured through high-level signaling.

For an SCell (called a cell A, with a cell index, ServCellIndex>0), for example, a cell with ServCellIndex=3 is carrier A. When RRC configures CrossCarrierSchedulingConfig, the scheduling cell information schedulingCellInfo for the cell A is configured as "own", i.e., self-scheduling, and cif-Presence of the cell A is configured as "true", and a bit field of CIF exists.

The number of indexes of scheduling cells for scheduling the primary cell is configured as a preset number. The preset number may be a positive integer such as 1, 2, 3, or the like. In this way, the number of SCells for scheduling a PCell is limited, and for example, the preset number is 1, which means that only one SCell can schedule a PCell.

To sum up, in the implementation, it is achieved that the PCell can be scheduled by the SCell, and the PCell also is capable of self-scheduling.

According to the implementation, a basic configuration structure of Configuration of CrossCarrierSchedulingConfig is not changed, and it is only described for the case in which, for a PCell, schedulingCellInfo can be configured as "other". In a case where, for the PCell, schedulingCellInfo is configured as "other", the PCell also is capable of self-scheduling by default. In this case, when the PCell performs self-scheduling, there is no CIF or there is a CIF and CIF=0 which indicates scheduling the PCell. When the PCell is cross-carrier scheduled by the SCell, the DCI corresponding to the PCell is received according to a configured CIF value (for example, CIF=1). In this case, the configuration of CrossCarrierSchedulingConfig for the SCell does not need to be modified. When the PCell is scheduled, schedulingCellInfo needs to be configured as "own", i.e., self-scheduling.

In the configuration method for scheduling a primary cell provided in the implementation, the primary cell is extended to be configured as being cross-carrier scheduled and at the same time the primary cell is capable of self-scheduling by default, so that it can be realized that a SCell schedules the primary cell, and the demand for control resources of the primary cell can be reduced, the control overhead of the primary cell is better shared through the dynamic load of the SCell, and the scheduling flexibility of the 5G system in a case of reusing the 4G spectrum is improved.

In an implementation, in a case where a cell is a primary cell, the scheduling cell information of the primary cell is configured as self-scheduling and as being cross-carrier scheduled; and whether a CIF exists in the primary cell is configured, and the cell index of the SCell for scheduling the primary cell is configured and the CIF value of the primary cell used in a the SCell is configured.

In a CA scenario, in a case where RRC configures CrossCarrierSchedulingConfig for a PCell (referred to as a cell C, with a cell index ServCellIndex-0), scheduling cell information schedulingCellInfo is configured as "own and other" for the cell C, which indicates that self-scheduling and being cross-carrier scheduled are both supported. That is, a new option is added to schedulingCellInfo, which is "own and other ". In this case, whether the CIF of the cell C (called a scheduled carrier) exists (cif-Presence), a scheduling cell index_(schedulingCellId), and a CIF value (cif-InSchedulingCell) are to be configured. The CIF value indicates a CIF value used by the cell C in a case where a scheduling cell, SCell, (referred to as a scheduling cell A) is scheduling the cell C. For example: cif-Presence is configured as "false", and in this case the cell C does not support a CIF, that is, the cell C does not support being cross-carrier scheduled by other carriers. The cell index of the scheduling cell A is configured, and in this case the scheduling cell A is an SCell, that is, the cell index of the scheduling cell A is determined by configuring ServCellIndex corresponding to schedulingCellId. ServCellIndex of the scheduling cell A is greater than 0, and may be an integer ranged from 1 to 31. For example, ServCellIndex=2. The CIF value of the cell C used in the scheduling cell A is configured. Optionally, the CIF value (cif-InSchedulingCell) may be configured as an integer ranged from 1 to 7, for example, CIF=3.

For example, the element of CrossCarrierSchedulingConfig is modified as follows.

| CrossCarrierSchedulingConfig information element |
| --- |
| -- ASN1START<br>-- TAG-CrossCarrierSchedulingConfig-START<br>CrossCarrierSchedulingConfig ::=　　　　　　SEQUENCE {<br>　　schedulingCellInfo　　　　　　　　　　　　CHOICE {<br>　　　　own　　　　　　　　　　　　　　　　SEQUENCE {　　　-<br>　　- Cross carrier scheduling: scheduling cell<br>　　　　　　cif-Presence　　　　　　　　　　BOOLEAN<br>　　　　},<br>　　　　other　　　　　　　　　　　　　　SEQUENCE {　　　-<br>　　- Cross carrier scheduling: scheduled cell<br>　　　　　　schedulingCellId　　　　　　　　ServCellIndex,<br>　　　　　　cif-InSchedulingCell　　　　　　INTEGER (1..7)<br>　　　　}<br>　　　　"own and other"　　　　　　　　　　SEQUENCE<br>　　{　　　　　　　　　　　　　　　　　　　　-- Cross carrier scheduling: scheduled cell<br>　　cif-Presence　　　　　　　　　　　　　BOOLEAN<br>　　　　　　schedulingCellId　　　　　　　　ServCellIndex,<br>　　　　　　cif-InSchedulingCell　　　　　　INTEGER (1..7)<br>　　　　}<br>　　},<br>　　...<br>}<br>-- TAG-CrossCarrierSchedulingConfig-STOP<br>-- ASN1STOP |

There is a restriction on a PCell with a self-scheduling function. Optionally, the DCI for transmitting self-scheduling on the PCell does not have a CIF. That is, there is no cif-presence for the option "own and other", or Presence is always configured as "false".

The newly added option "own and other" for schedulingCellInfo is limited to only being configured on a PCell, i.e., which can be configured on a cell with a scheduling cell index ServCellIndex which is 0, and the newly added option cannot be configured when ServCellIndex>0. Alternatively, the newly added option is limited to be configured only on a PCell or on a PSCell, where ServCellIndex=0 indicates the PCell and ServCellIndex being a configurable value indicates the PSCell. The configurable value is optionally an integer ranged from 1 to 31.

For an SCell (called a cell A, with a cell index ServCellIndex>0), for example, a cell with ServCellIndex=3 is the cell A. When RRC configures CrossCarrierSchedulingConfig, scheduling cell information schedulingCellInfo for the cell A is configured as "own", i.e., self-scheduling, cif-Presence is configured as "true", and a bit field of CIF exists.

The number of indexes of scheduling cells for scheduling the primary cell is configured as a preset number. The preset number may be a positive integer such as 1, 2, 3, or the like. In this way, the number of SCells for scheduling a PCell is limited, and for example, the preset number is 1, which means that only one SCell can schedule a PCell.

To sum up, in the implementation, it is achieved that the SCell can schedule the PCell, and the PCell also is capable of self-scheduling.

In the implementation, an option of "own and other", i.e., self-scheduling and being cross-carrier scheduled, is added for the scheduling cell information schedulingCellInfo in the basic structure of configuration of CrossCarrierSchedulingConfig. In this case, when self-scheduling is performed, no CIF exists or a CIF exists and satisfies CIF=0, which indicates the PCell is scheduled. When the PCell is cross-carrier scheduled by the SCell, the DCI corresponding to the SCell is received according to a configured CIF value (for example, CIF=1) in the scheduling cell. In this case, the configuration of CrossCarrierSchedulingConfig for the SCell does not need to be modified. When the PCell is scheduled, schedulingCellInfo needs to be configured as "own", i.e., self-scheduling.

In the configuration method for scheduling a primary cell provided by the implementation, by that the primary cell is extended to be configured as being cross-carrier scheduled in addition to self-scheduling, it is realized that a SCell schedules the primary cell, the demand for control resources of the primary cell can be reduced, the control overhead of the primary cell is better shared through the dynamic load of the SCell, and the scheduling flexibility of the 5G system in case of reusing the 4G spectrum is improved.

In an implementation, in a case where the cell is the primary cell, the scheduling cell information of the primary cell is configured as self-scheduling, and whether the primary cell is allowed to be cross-carrier scheduled by a SCell is configured. In a case where the primary cell is allowed to be cross-carrier scheduled by a SCell, the cell index of the SCell for scheduling the primary cell is configured, and the CIF value of the primary cell used in the SCell is configured.

In a CA scenario, in a case where RRC configures CrossCarrierSchedulingConfig for a PCell (referred to as a cell C, with a cell index ServCellIndex=0), the scheduling cell information schedulingCellInfo of the cell C is configured as "own", i.e., self-scheduling. Whether an SCell is allowed to schedule a PCell or not is configured. When the SCell is allowed to schedule the PCell, the cell index of the SCell is configured, and the CIF value used to indicate the PCell when the SCell schedules the PCell, is configured. For example, ServCellIndex of the SCell is configured as ServCellIndex=3, and the CIF value used to indicate the PCell when the SCell schedules the PCell, is configured as CIF=1.

Optionally, configuring whether the primary cell is allowed to be cross-carrier scheduled by a SCell includes: explicitly configuring whether the primary cell is allowed to be cross-carrier scheduled by a SCell; or, determining whether the primary cell is allowed to be cross-carrier scheduled by a SCell according to a preset rule.

In an exemplary implementation, for the explicit configuration of whether the primary cell is allowed to be cross-carrier scheduled by a SCell, whether an SCell is allowed to schedule a PCell or not is configured firstly. Then, in a case where an SCell is not allowed to schedule a PCell, it is not necessary to configure the cell index of the SCell, and the CIF value used to indicate the PCell in a case where the SCell schedules the PCell; and in a case where a PCell is allowed to be cross-carrier scheduled by a SCell, it is necessary to configure the cell index of an SCell, and the CIF value used to indicate the PCell in a case where the SCell schedules the PCell.

For determination of whether the primary cell is allowed to be cross-carrier scheduled by a SCell according to the preset rule, the preset rule includes at least one of the following: in a case where the CIF value of the primary cell used in the SCell is configured, the primary cell is allowed to be cross-carrier scheduled by a SCell; in a case where the CIF value of the primary cell used in the SCell is not configured, the primary cell is not allowed to be cross-carrier scheduled by a SCell; in a case where the cell index of the SCell for scheduling the primary cell is configured, the primary cell is allowed to be cross-carrier scheduled by a SCell, and in a case where the cell index of the SCell for scheduling the primary cell is not configured, the primary cell is not allowed to be cross-carrier scheduled by a SCell.

In an exemplary implementation, only the cell index of an SCell scheduling a PCell, and the CIF value used to indicate the PCell in a case where the SCell schedules the PCell are configured. Whether a PCell is allowed to be cross-carrier scheduled by a SCell may be indicated in one of the following manner: (1) in a case where a CIF value is configured, e.g., as an integer ranged from 1 to 7, it indicates that scheduling the PCell is allowed; and in a case where the CIF value is not configured, it indicates that scheduling the PCell is not allowed; (2) in a case where the index of an SCell scheduling a PCell is configured, e.g., as an integer ranged from 1 to 31, it indicates that scheduling the PCell is allowed; and in a case where the index of an SCell scheduling a PCell is not configured, it indicates that scheduling the PCell is not allowed.

For example, modification of the element of CrossCarrierSchedulingConfig is as follows: the configuration of the cell index of an SCell scheduling a PCell, and the configuration of the CIF value of the PCell used to indicate the PCell in a case where the SCell schedules the PCell are added, and in a case where the cell index of an SCell scheduling a PCell and the CIF value of the PCell are configured, i.e., schedulingSCellId is configured as an integer ranged from 1 to 31 (i.e., in this case a configurable value of schedulingSCellId, i.e., ServCellIndex may be configured as an integer ranged from 1 to 31) and cif-InSchedulingSCellforPCell is configured as an integer ranged from 1 to 7, scheduling the PCell is allowed; in a case where the cell index of an SCell scheduling a PCell and the CIF value of the PCell are not configured, i.e., schedulingSCellId and cif-InSchedulingSCellforPCell are not configured, scheduling the PCell is not allowed. In this case, schedulingSCellId and cif-InSchedulingSCellforPCell are optional.

| CrossCarrierSchedulingConfig information element |
| --- |
| ```
-- ASN1START
-- TAG-CrossCarrierSchedulingConfig-START
CrossCarrierSchedulingConfig ::=        SEQUENCE {
    schedulingCellInfo                      CHOICE {
        own                                     SEQUENCE {       -
        - Cross carrier scheduling: scheduling cell
            cif-Presence                            BOOLEAN
            schedulingSCellId                       ServCellIndex,       OPTIONAL
            cif-InSchedulingSCellforPCell               INTEGER (1..7)   OPTIONAL
        },
        other                                   SEQUENCE {       -
        - Cross carrier scheduling: scheduled cell
            schedulingCellId                        ServCellIndex,
            cif-InSchedulingCell                    INTEGER (1..7)
        }
    },
    ...
}
-- TAG-CrossCarrierSchedulingConfig-STOP
-- ASN1STOP
``` |

The preset rule also includes at least one of the following: in a case where a configured CIF value of a primary cell used in the SCell is an element within a set X of values, the primary cell is allowed to be cross-carrier scheduled by a SCell; in a case where the configured CIF value of the primary cell used in the SCell is Y and Y is not equal to any element within the set X of values, the primary cell is not allowed to be cross-carrier scheduled by a SCell; in a case where a value of a configured cell index of the SCell for scheduling the primary cell is an element within a set M of values, the primary cell is allowed to be cross-carrier scheduled by a SCell; and in a case where the value of the configured cell index of the SCell for scheduling the primary cell is N and N is not equal to any element within the set M of values, the primary cell is not allowed to be cross-carrier scheduled by a SCell. Each element in the set X of values is an integer greater than 0, such as an integer ranged from 1 to 7, and for example, Y is 0. Each element in the set M of values is an integer greater than 0, such as an integer ranged from 1 to 31, and for example, N is 0. In an exemplary implementation, whether a PCell is allowed to be cross-carrier scheduled by a SCell may be indicated in one of the following manners: (1) in a case where a CIF value is configured, e.g., as an integer ranged from 1 to 7, it indicates that scheduling the PCell is allowed, and in a case where the CIF value is not configured, it indicates that scheduling the PCell is not allowed; (2) in a case where the cell index of an SCell scheduling a PCell is configured as, e.g., an integer ranged from 1 to 31, it indicates that scheduling the PCell is allowed, and in a case where the index of an SCell scheduling a PCell is configured as 0, it indicates that scheduling the PCell is not allowed.

For example, the element of CrossCarrierSchedulingConfig is modified as follows: the configuration of the cell index of an SCell scheduling a PCell, and the configuration of the CIF value of the PCell used to indicate the PCell in a case where the SCell schedules the PCell are added, and in a case where the cell index of an SCell scheduling a PCell and the CIF value of the PCell are configured, i.e., schedulingSCellId is configured as an integer ranged from 1 to 31 and cif-InSchedulingSCellforPCell is configured as an integer ranged from 1 to 7, scheduling the PCell is allowed; and, in a case where the index schedulingSCellId of an SCell scheduling a PCell is configured as 0 and/or the CIF value of the PCell is configured as 0, i.e., schedulingSCellId is configured as 0 and/or cif-InSchedulingCellforPCell is configured as 0, scheduling the PCell is not allowed. As the CIF valued as 0 is used for indicating that the SCell is configured as self-scheduling, i.e., a CIF existing and satisfying CIF=0, indicates the SCell itself; while, schedulingSCellId valued as 0 indicates the PCell.

| CrossCarrierSchedulingConfig information element |
| --- |
| ```
-- ASN1START
-- TAG-CrossCarrierSchedulingConfig-START
CrossCarrierSchedulingConfig ::=        SEQUENCE {
    schedulingCellInfo                      CHOICE {
        own                                     SEQUENCE {       -
        - Cross carrier scheduling: scheduling cell
            cif-Presence                            BOOLEAN
schedulingSCellId                       ServCellIndex,
            cif-InSchedulingSCellforPCell               INTEGER (0..7)
        },
        other                                   SEQUENCE {       -
        - Cross carrier scheduling: scheduled cell
            schedulingCellId                        ServCellIndex,
            cif-InSchedulingCell                    INTEGER (1..7)
        }
    },
    ...
}
-- TAG-CrossCarrierSchedulingConfig-STOP
-- ASN1STOP
``` |

Whether cif-Presence is configured as "true" (a CIF exists) or false (the CIF does not exist) indicates whether a bit field of CIF exists. Whether the bit field of CIF exists has a restriction on a PCell with a self-scheduling function. Optionally, the DCI which is self-scheduling sent on the PCell does not have a CIF. When "own" is configured, no cif-presence exists, or Presence is always configured as "false".

For an SCell (called a cell A, with a cell index ServCellIndex>0), for example, a cell with ServCellIndex=3 is the cell A. When RRC configures CrossCarrierSchedulingConfig, scheduling cell information schedulingCellInfo for the cell A is configured as "own", i.e., self-scheduling, and cif-Presence is configured as "true", i.e., the bit field of CIF exists.

The number of indexes of scheduling cells for scheduling the primary cell is configured as a preset number. The preset number may be a positive integer such as 1, 2, 3, or the like. In this way, the number of SCells for scheduling a PCell is limited. For example, the preset number is 1, which means that only one SCell can schedule a PCell.

To sum up, in the implementation, it is achieved that the SCell can schedule the PCell, and the PCell also is capable of self-scheduling.

In the implementation, in a case where the scheduling cell information schedulingCellInfo in the basic structure of configuration of CrossCarrierSchedulingConfig is configured as "own", i.e., self-scheduling, the configuration of the cell index of the SCell scheduling the PCell is added and the CIF value used to indicate the PCell in a case where the SCell schedules the PCell is added. In this case, in a case where the PCell is self-scheduling, there is no CIF or there is a CIF and CIF=0, which indicates the PCell is scheduled. When the PCell is cross-carrier scheduled by the SCell, the DCI corresponding to the PCell is received according to a configured CIF value (for example, CIF=1). In this case, the Configuration of CrossCarrierSchedulingConfig for the SCell does not need to be modified. When the PCell is scheduled, schedulingCellInfo needs to be configured as "own", i.e., self-scheduling.

In the configuration method for scheduling a primary cell provided in the implementations, the primary cell is extended to be configured as a scheduled cell in addition to be configured as a scheduling cell, so that the function of a SCell scheduling the primary cell can be realized, the demand for control resources of the primary cell can be reduced, and the control overhead of the primary cell is shared better through the dynamic load of the SCell, and the scheduling flexibility of the 5G system in a case of reusing the 4G spectrum is improved.

In an implementation, in a case where the cell is a SCell, the scheduling cell information of the SCell is configured as self-scheduling; and whether the SCell is allowed to schedule a primary cell is configured, and the CIF value of the primary cell used in the SCell is configured when the SCell is allowed to schedule the primary cell.

Optionally, configuring whether the SCell is allowed to schedule the primary cell, includes: explicitly configuring whether the SCell is allowed to schedule the primary cell; or, determining whether the SCell is allowed to schedule the primary cell according to a preset rule.

The preset rule includes: in a case where the CIF value of the primary cell used in the SCell is configured, scheduling the primary cell is allowed, and in a case where the CIF value of the primary cell used in the SCell is not configured, scheduling the primary cell is not allowed; or, in a case where the configured CIF value of the primary cell used in the SCell is an element within a set X of values, scheduling the primary cell is allowed, and in a case where the configured CIF value of the primary cell used in the SCell is Y and Y is not equal to any element within the set X of values, scheduling the primary cell is not allowed. Each element in the set X of values is an integer greater than 0, i.e., an integer ranged from 1 to 7.

In a CA scenario, in a case where RRC configures CrossCarrierSchedulingConfig for a PCell (referred to as a cell C, with a cell index ServCellIndex=0), the scheduling cell information schedulingCellInfo of the cell C is configured as "own", i.e., self-scheduling. That is, the configuration for the PCell is not changed, whether an SCell is allowed to schedule the PCell depends on the configuration of the SCell. Whether cif-Presence is configured as "true" (a CIF exists) or false (the CIF does not exist) indicates whether a bit field of CIF exists. Whether a bit field of CIF exists has a restriction on a PCell with a self-scheduling function. Optionally, the DCI for self-scheduling sent on the PCell does not have a CIF. When scheduling cell information of the PCell is configured as "own", cif-Presence is not present, or cif-Presence is always configured as "false".

For an SCell (called a cell A, with a cell index ServCellIndex>0), for example, a cell with ServCellIndex=3 is the cell A. When RRC configures CrossCarrierSchedulingConfig, scheduling cell information schedulingCellInfo for the cell A is configured as "own", i.e., self-scheduling, and cif-Presence is configured as "true", and a bit field of CIF exists. Whether the PCell is scheduled is configured in one of the following manners. Manner 1: firstly, whether scheduling the PCell is allowed or not is configured. Then, in a case where scheduling the PCell is not allowed, it is not necessary to configure the CIF value of the PCell used in the SCell; in a case where scheduling the PCell is allowed, it is necessary to configure the CIF value of the PCell used in the SCell. Manner 2: only the CIF value of the PCell used in the SCell is configured. For Manner 2, whether scheduling the PCell is allowed or not may be indicated in one of the following manners. Manner 2-1: in a case where the CIF value of the PCell used in the SCell is configured as, e.g., an integer ranged from 1 to 7, it indicates that scheduling the PCell is allowed, and in a case where the CIF value of the PCell used in the SCell is not configured, it indicates that scheduling the PCell is not allowed. Manner 2-2: in a case where the CIF value of the PCell used in the SCell is configured as, e.g., an integer ranged from 1 to 7, it indicates that scheduling the PCell is allowed, and in a case where the CIF value is configured as 0, it indicates that scheduling the PCell is not allowed.

For example, the element of CrossCarrierSchedulingConfig is modified as follows (Manner 2-1): the configuration of CIF value of the PCell used in the SCell is added, and in a case where CIF value of the PCell used in the SCell is configured, i.e., cif-InSchedulingCellforPCell is configured as an integer ranged from 1 to 7, it indicates that scheduling the PCell is allowed; in a case where CIF value of the PCell used in a the SCell is not configured, i.e., cif-InSchedulingCellforPCell is not configured, it indicates that scheduling the PCell is not allowed. In this case, cif-InSchedulingCellforPCell is optional.

| CrossCarrierSchedulingConfig information element |
| --- |
| -- ASN1START |
| -- TAG-CrossCarrierSchedulingConfig-START |
| CrossCarrierSchedulingConfig ::=   SEQUENCE { |
|    schedulingCellInfo           CHOICE { |
|      own                      SEQUENCE { |
| -- Cross carrier scheduling: scheduling cell |
|        cif-Presence                BOOLEAN |
|        cif-InSchedulingCellforPCell   INTEGER (1..7) OPTIONAL |
|      }, |
|      other                    SEQUENCE { |
| -- Cross carrier scheduling: scheduled cell |
|        schedulingCellId        ServCellIndex, |
|        cif-InSchedulingCell         INTEGER (1..7) |
|      } |
|    }, |
|    ... |
| } |
| -- TAG-CrossCarrierSchedulingConfig-STOP |
| -- ASN1STOP |

For example, modification of the element of CrossCarrierSchedulingConfig is as follows (Manner 2-2): the configuration of CIF value of the PCell used in the SCell is added, and in a case where CIF value of the PCell used in the SCell is configured and it is configured as an integer ranged from 1 to 7, i.e., cif-InSchedulingSCellforPCell is configured as an integer ranged from 1 to 7, it indicates that scheduling the PCell is allowed; in a case where CIF value of the PCell used in the SCell is configured as 0, i.e., cif-InSchedulingSCellforPCell is configured as 0, it indicates that scheduling the PCell is not allowed. The CIF valued as 0 is used for indicate that the SCell is self-scheduling, i.e., a case where a CIF exists and satisfies CIF=0 is used to indicate the SCell itself.

| CrossCarrierSchedulingConfig information element |
| --- |
| -- ASN1START |
| -- TAG-CrossCarrierSchedulingConfig-START |
| CrossCarrierSchedulingConfig ::=   SEQUENCE { |
|     schedulingCellInfo    CHOICE { |
|         own    SEQUENCE { |
| -- Cross carrier scheduling: scheduling cell |
|             cif-Presence    BOOLEAN |
|             cif-InSchedulingSCellforPCell    INTEGER (1..7) |
|         }, |
|         other    SEQUENCE { |
| -- Cross carrier scheduling: scheduled cell |
|             schedulingCellId |
| ServCellIndex, |
|             cif-InSchedulingCell    INTEGER (1..7) |
|         } |
|     }, |
|     ... |
| } |
| -- TAG-CrossCarrierSchedulingConfig-STOP |
| -- ASN1STOP |

The number of indexes of scheduling cells for scheduling the primary cell is configured as a preset number. The preset number may be a positive integer such as 1, 2, 3, or the like. In this way, the number of SCells for scheduling a PCell is limited. For example, the preset number is 1, which means that only one SCell can schedule a PCell.

To sum up, in the implementation, it is achieved that the SCell can schedule the PCell, and the PCell also is capable of self-scheduling.

In the implementation, the scheduling cell information schedulingCellInfo in the basic structure of configuration of CrossCarrierSchedulingConfig is configured as "own", i.e., self-scheduling, and in a case where a CIF exists, the configuration of whether scheduling a PCell is allowed, and the configuration of the CIF value used to indicate the PCell in a case where an SCell schedules the PCell are added. The PCell does not need to modify its configuration, but still is capable of self-scheduling. In this case, in a case where the PCell is self-scheduling, there is no CIF, or, there is CIF and CIF=0, which indicates that the PCell is scheduled; and in a case where the PCell is allowed to be cross-carrier scheduled by the SCell, the DCI for scheduling the PCell is received according to the CIF value (for example, CIF=1) configured for the PCell on the SCell.

In the configuration method for scheduling a primary cell provided in the implementations, in a case where a SCell is extended to be configured as self-scheduling, the SCell is configured to be allowed to schedule a primary cell so that the function of the SCell scheduling the primary cell can be realized, and thus, the demand for control resources of the primary cell can be reduced, the control overhead of the primary cell is shared better through the dynamic load of the SCell, and the scheduling flexibility of the 5G system in a case of reusing the 4G spectrum is improved.

Based on the above implementation, the configuration method for scheduling a primary cell further includes: in a case where the primary cell supports self-scheduling and being cross-carrier scheduled, determining a downlink control information (DCI) format for scheduling the primary cell or a type of search space for scheduling the primary cell in one of the following manners: only common search space (CSS) and user equipment (UE) specific search space (USS) that bears fallback DCI are configured on the primary cell, and all USS bearing non-fallback DCI is located in a scheduling cell for scheduling the primary cell; or, the CSS, the USS bearing fallback DCI and the USS bearing non-fallback DCI are configured on the primary cell, and the USS bearing non-fallback DCI is partially or entirely located in a scheduling cell for scheduling the primary cell; or, CSS bearing fallback DCI or the USS bearing fallback DCI is also partially or entirely located in a scheduling cell for scheduling the primary cell by adding a CIF.

In an exemplary implementation, in a case where an SCell is supported to schedule a PCell, a DCI format or a type of search space for scheduling the PCell is determined according to one of the following manners.

Manner 1: only CSS and USS that bears fallback DCI (DCI format 0_0 or DCI format 1_0) are configured on a PCell, and USS bearing non-fallback DCI (DCI format 0_1, DCI format 1_1, DCI format 0_2, or DCI format 1_2) is located on an SCell scheduling the PCell. In this case, the DCI format 0_0 without a CIF or DCI format 1_0 without a CIF does not support being cross-carrier scheduled by other carriers, so only CSS and USS that bears fallback DCI are configured on a PCell, that is, only the DCI format 0_0 without a CIF or DCI format 1_0 without a CIF is supported. The DCI format 0_1, DCI format 1_1, DCI format 0_2, DCI format 0_2 or the like each with a CIF supports being cross-carrier scheduled. In order to share the control overhead on the PCell as much as possible through load, the USS bearing non-fallback DCI is entirely located on an SCell scheduling the PCell.

Manner 2: CSS, USS that bears fallback DCI, and USS that bears non-fallback DCI are configured on a PCell, and USS bearing non-fallback DCI is partially or entirely located on an SCell scheduling the PCell. In this case, the DCI format 0_0 without a CIF or DCI format 1_0 without a CIF does not support being cross-carrier scheduled by other carriers, so CSS and USS that bears fallback DCI are configured on the PCell, but in order to keep a certain amount of flexibility for scheduling, the USS that bears non-fallback DCI may also be configured on the PCell. DCI format 0_1, DCI format 1_1, DCI format 0_2, or DCI format 0_2 or the like each with a CIF supports being cross-carrier scheduled, and in order to share the control overhead on the PCell more flexibly through load, the USS bearing non-fallback DCI may also be at least partially located on the SCell scheduling the PCell.

Manner 3: CSS bearing fallback DCI or USS bearing fallback DCI is also partially or entirely located on an SCell that schedules a PCell by adding a CIF. In this case, a configurable CIF is added to DCI format 0_0 or DCI format 1_0 to support being cross-carrier scheduled, and thus scheduling a PCell through an SCell is supported.

That CSS or USS is partially or entirely located on the scheduling cell that schedules a primary cell, includes: a scaling factor A is configured for the CSS or the USS, to adjust a number of candidate sets located on the primary cell and adjust a number of candidate sets on the scheduling cell for scheduling the primary cell.

Configuring the scaling factor A for the CSS or USS to adjust a number of candidate sets located on the primary cell and adjust a number of candidate sets on the scheduling cell for scheduling the primary cell, includes: the number of candidate sets on the primary cell remains unchanged, and the number of candidate sets on the scheduling cell for scheduling the primary cell is A*M(L); or, the number of candidate sets on the primary cell is A*M(L), and the number of candidate sets on the scheduling cell for scheduling the primary cell is M(L)−A*M(L); or, the number of candidate sets on the scheduling cell for scheduling the primary cell is A*M(L), and the number of candidate sets on the primary cell is M(L)−A*M(L); where M(L) is a number of candidate sets for an aggregation level L. The number of candidate sets for the aggregation level L is configured as M(L), where L=1, 2, 4, 8, 16. For example, USS #3 configured on the primary cell includes 8 candidate sets for L=1, and includes 4 candidate sets for L=2. The scaling factor A is used to adjust M(L) such that the number of candidate sets assigned to the primary cell and the number of candidate sets assigned to the scheduling cell for scheduling the primary cell are adjusted. Manner 1: The number of candidate sets on the primary cell remains unchanged, and the number of candidate sets on the scheduling cell for scheduling the primary cell is A*M(L), where A is a number not less than 0. For example, in a case where A=0.5, USS #3 configured on the primary cell includes 8 candidate sets for L=1, and 4 candidate sets for L=2; USS #3 on the scheduling cell for scheduling the primary cell includes 4 candidate sets for L=1, and 2 candidate sets for L=2. Manner 2: the number of candidate sets on the primary cell is A*M(L), and the number of candidate sets on the scheduling cell for scheduling the primary cell is M(L)−A*M(L); or, the number of candidate sets on the scheduling cell for scheduling the primary cell is A*M(L), and the number of candidate sets on the primary cell is M(L)−A*M(L), where A is a number not less than 0. For example, in a case where A=0.5, USS #3 on the primary cell includes 4 candidate sets for L=1, and 2 candidate sets for L=2; USS #3 on the scheduling cell for scheduling the primary cell includes 4 candidate sets for L=1, and 2 candidate sets for L=2.

The implementations provides a method to determine the DCI format or the type of search space in a case where the SCell schedules the primary cell, and the method can reduce the demand for the control resources of the primary cell to varying degrees in a case where the SCell schedules the primary cell by classifying the DCI format and the type of search space, and the control overhead of the primary cell is shared better through the dynamic load of the SCell, and the scheduling flexibility of the 5G system in a case of reusing the 4G spectrum is improved.

FIG. 2 shows a structure diagram of a configuration apparatus for scheduling a primary cell, and the apparatus includes: a cross-carrier scheduling configuration module 210, which is configured to configure cross-carrier scheduling configuration information of a cell, such that the primary cell supports self-scheduling and being cross-carrier scheduled by a SCell.

In an implementation, the cross-carrier scheduling configuration module 210 includes a first configuration unit, which is configured, in a case where the cell is the primary cell, to configure the scheduling cell information of the primary cell as being cross-carrier scheduled; and to configure a cell index of the SCell for scheduling the primary cell and to configure a carrier indicator field (CIF) value of the primary cell used in the SCell.

In an implementation, the cross-carrier scheduling configuration module 210 includes a second configuration unit, which is configured, in a case where the cell is the primary cell, to configure the scheduling cell information of the primary cell as self-scheduling and as being cross-carrier scheduled; and to configure whether a CIF exists in the primary cell, and to configure the cell index of the SCell for scheduling the primary cell and configure the CIF value of the primary cell used in the SCell.

In an implementation, the cross-carrier scheduling configuration module 210 includes a third configuration unit, which is configured, in a case where the cell is the primary cell, to configure the scheduling cell information of the primary cell as self-scheduling; and to configure whether the primary cell is allowed to be cross-carrier scheduled by a SCell, and in a case where the primary cell is allowed to be cross-carrier scheduled by a SCell, to configure the cell index of the SCell for scheduling the primary cell and to configure the CIF value of the primary cell used in the SCell.

In an implementation, the cross-carrier scheduling configuration module 210 includes a fourth configuration unit, which is configured, in a case where the cell is a SCell, to configure the scheduling cell information of the SCell as self-scheduling; and configure whether the SCell is allowed to schedule the primary cell, and in a case where the SCell is allowed to schedule the primary cell, to configure the CIF value of the primary cell used in the SCell.

In an implementation, the fourth configuration unit is configured to explicitly configure whether a SCell is allowed to schedule a primary cell; or, determine whether the SCell is allowed to schedule the primary cell according to a preset rule.

Optionally, the preset rule includes: in a case where the CIF value of the primary cell used in the SCell is configured, scheduling the primary cell is allowed, and in a case where the CIF value of the primary cell used in the SCell is not configured, scheduling the primary cell is not allowed; or, in a case where the configured CIF value of the primary cell used in the SCell is an element within a set X of values, scheduling the primary cell is allowed, and in a case where the configured CIF value of the primary cell used in the SCell is Y and Y is not equal to any element within the set X of values, scheduling the primary cell is not allowed.

In an implementation, the first configuration unit is further configured to: in a case where the scheduling cell information of the primary cell is configured as being cross-carrier scheduled, the primary cell is also capable of self-scheduling.

Optionally, that the primary cell is also capable of self-scheduling, includes: the primary cell is capable of self-scheduling and no CIF exists; or, the primary cell is capable of self-scheduling, and whether a CIF exists is configured through high-level signaling.

In an implementation, the configuration apparatus for scheduling a primary cell, further includes: a scheduling cell index number configuring module, which is configured to configure the number of the cell index of the SCell for scheduling the primary cell to be a preset number. Optionally, the preset number is 1.

In an implementation, the third configuration unit is configured to: explicitly configure whether the primary cell is allowed to be cross-carrier scheduled by a SCell; or, determine whether the primary cell is allowed to be cross-carrier scheduled by a SCell according to a preset rule.

Optionally, the preset rule includes at least one of: in a case where the CIF value of the primary cell used in the SCell is configured, the primary cell is allowed to be cross-carrier scheduled by a SCell, and in a case where the CIF value of the primary cell used in the SCell is not configured, the primary cell is not allowed to be cross-carrier scheduled by a SCell; and in a case where the cell index of the SCell for scheduling the primary cell is configured, the primary cell is allowed to be cross-carrier scheduled by a SCell, and in a case where the cell index of the SCell for scheduling the primary cell is not configured, the primary cell is not allowed to be cross-carrier scheduled by a SCell.

Optionally, the preset rule includes at least one of: in a case where the configured CIF value of the primary cell used in the SCell is an element within a set X of values, the primary cell is allowed to be cross-carrier scheduled by a SCell, and in a case where the configured CIF value of the primary cell used in the SCell is Y and Y is not equal to any element within the set X of values, the primary cell is not allowed to be cross-carrier scheduled by a SCell; and in a case where the value of the configured cell index of the SCell for scheduling the primary cell is an element within a set M of values, the primary cell is allowed to be cross-carrier scheduled by a SCell, and in a case where the value of the configured cell index of the SCell for scheduling the primary cell is N and N is not equal to any element within the set M of values, the primary cell is not allowed to be cross-carrier scheduled by a SCell.

In an implementation, the configuration apparatus for scheduling a primary cell, further includes: a DCI format/search space dividing module, which is configured to, in a case where the primary cell supports self-scheduling and being cross-carrier scheduled, determine a downlink control information (DCI) format or a type of search space for scheduling the primary cell in one of the following manners: only common search space (CSS) and user equipment (UE) specific search space (USS) that bears fallback DCI are configured on the primary cell, and the USS bearing non-fallback DCI is entirely located in a scheduling cell for scheduling the primary cell; or, the CSS, the USS bearing fallback DCI and the USS bearing non-fallback DCI are configured on the primary cell, and the USS bearing non-fallback DCI is also partially or entirely located in a scheduling cell for scheduling the primary cell; or, CSS bearing fallback DCI or the USS bearing fallback DCI is also partially or entirely located in a scheduling cell for scheduling the primary cell by adding a CIF.

Optionally, the DCI format/search space dividing module, further includes: a candidate set number adjusting module, which is configured to configure a scaling factor A for CSS or USS, to adjust a number of candidate sets located on the primary cell and adjust a number of candidate sets on the scheduling cell for scheduling the primary cell.

Optionally, the candidate set number adjusting module is configured to configure that: the number of candidate sets on the primary cell remains unchanged, and the number of candidate sets on the scheduling cell for scheduling the primary cell is $A*M(L)$; or, the number of candidate sets on the primary cell is $A*M(L)$, and the number of candidate sets on the scheduling cell for scheduling the primary cell is $M(L)-A*M(L)$; or, the number of candidate sets on the scheduling cell for scheduling the primary cell is $A*M(L)$, and the number of candidate sets on the primary cell is $M(L)-A*M(L)$; where $M(L)$ is the number of candidate sets for an aggregation level L.

The function of each module in the apparatus according to the embodiments of the present disclosure can be found in the corresponding description in the embodiments of methods described above and will not be repeated herein.

FIG. 3 shows a structure diagram of a device, which includes: a processor 310 and a memory 320. The number of processors 310 in the device may be one or more, and in FIG. 3 one processor 310 is taken as an example. The number of memories 320 in the device may be one or more, and in FIG. 3 one memory 320 is taken as an example. The processor 310 and the memory 320 in the device may be connected via a bus or in other ways, and in FIG. 3 the processor 310 and the memory 320 being connected via a bus is taken as an example.

As a computer-readable storage medium, the memory 320 may be configured to store software programs, computer-executable programs and modules, such as program instructions/modules corresponding to the device in the embodiments of the present disclosure (e.g., the cross-carrier scheduling configuration module in the configuration apparatus for scheduling a primary cell). The memory 320 may include a program storage region and a data storage region. The program storage region can store an operating system, and at least one application program required by functions. The data storage region can store data created according to the use of the device and the like. In addition, the memory 320 may include a high-speed random-access memory, and may also include a non-volatile memory, for example, at least one magnetic disk storage device, a flash memory device or other non-volatile solid-state storage devices. In some instances, the memory 320 may further include memories remotely arranged relative to the processor 310. These remote memories may be connected to the device via a network. Examples of the network include, but are not limited to, the Internet, Intranet, local area networks, mobile communication networks and combinations thereof.

The device provided above may be configured to perform any method in the embodiments of the present disclosure.

Embodiments of the present disclosure provide a storage medium, and the storage medium stores computer programs, and the computer programs, when executed by a processor, perform any method provided in the embodiments of the present disclosure.

The term user terminal encompasses any suitable type of wireless user devices, such as a mobile phone, a portable data processing apparatus, a portable web browser or a vehicle-mounted mobile station.

In general, embodiments of the present disclosure may be implemented in hardware or specialized circuits, software, logic, or any combination thereof. For example, some aspects may be implemented in hardware while other aspects may be implemented in firmware or software that may be executed by a controller, a microprocessor, or other computing apparatuses, although the present disclosure is not limited thereto.

The embodiments of the present disclosure may be implemented by executing computer program instructions by a data processor of a mobile apparatus, for example, in a processor entity, or by hardware, or by a combination of software and hardware. The computer program instructions may be assembly instructions, Instruction Set Architecture (ISA) instructions, machine instructions, machine-related instructions, microcodes, firmware instructions, status setting data, or source or object codes written in any combination of one or more programming languages.

The block diagram of any logic flow in drawings of the present disclosure may represent program steps, or may represent interconnected logic circuits, modules and functions, or may represent a combination of program steps and logic circuits, or, modules and functions. The computer program may be stored in a memory. The memory may be of any type suitable for a local technical environment and may be implemented by using any suitable data storage technology such as, but is not limited to, a Read-Only Memory (ROM), a Random Access Memory (RAM), optical storage devices and systems (Digital Video Discs (DVDs) or Compact Disks (CDs)) or the like. The computer-readable medium may include a non-transitory storage medium. The data processor may be of any type suitable for the local technical environment such as, but is not limited to, a general-purpose computer, a special-purpose computer, a microprocessor, a Digital Signal Processing (DSP), an Application Specific Integrated Circuit (ASIC), a Field-Programmable Gate Array (FPGA), and a processor based on a multi-core processor architecture.

What is claimed is:

1. A configuration method for scheduling a primary cell, comprising:
configuring cross-carrier scheduling configuration information of a cell, such that the primary cell supports self-scheduling and being cross-carrier scheduled by a secondary cell (SCell);
wherein in a case where the cell is the primary cell, the configuring cross-carrier scheduling configuration information of a cell comprises one of the following:
configuring scheduling cell information of the primary cell as being cross-carrier scheduled, and configuring a cell index of the SCell for scheduling the primary cell and a carrier indicator field (CIF) value of the primary cell used in the SCell; or,
configuring the scheduling cell information of the primary cell as self-scheduling and being cross-carrier scheduled, and configuring whether a CIF exists in the primary cell, the cell index of the SCell for scheduling the primary cell and a CIF value of the primary cell used in the SCell; or,
configuring the scheduling cell information of the primary cell as self-scheduling, configuring whether the primary cell is allowed to be cross-carrier scheduled by the SCell, and in a case where the primary cell is allowed to be cross-carrier scheduled by the SCell, configuring the cell index of the SCell for scheduling the primary cell and the CIF value of the primary cell used in the SCell; and,
wherein in a case where the cell is the SCell, the configuring cross-carrier scheduling configuration information of a cell comprises:
configuring scheduling cell information of the SCell as self-scheduling, configuring whether the SCell is allowed to schedule the primary cell, and in a case where the SCell is allowed to schedule the primary cell, configuring the CIF value of the primary cell used in the SCell.

2. The method according to claim 1, wherein the configuring whether the SCell is allowed to schedule the primary cell comprises:
explicitly configuring whether the SCell is allowed to schedule the primary cell; or,
determining whether the SCell is allowed to schedule the primary cell according to a preset rule.

3. The method according to claim 2, wherein the preset rule comprises:
in a case where the CIF value of the primary cell used in the SCell is configured, the SCell is allowed to schedule the primary cell, and in a case where the CIF value of the primary cell used in the SCell is not configured, the SCell is not allowed to schedule the primary cell; or,
in a case where a configured CIF value of the primary cell used in the SCell is an element within a set X of values, the SCell is allowed to schedule the primary cell, and in a case where the configured CIF value of the primary cell used in the SCell is Y and Y is not equal to an element within the set X of values, the SCell is not allowed to schedule the primary cell.

4. The method according to claim 1, wherein in a case where the scheduling cell information of the primary cell is configured as being cross-carrier scheduled, the primary cell is capable of self-scheduling.

5. The method according to claim 4, wherein the primary cell is capable of self-scheduling, comprises:
the primary cell is capable of self-scheduling and no CIF exists; or,
the primary cell is capable of self-scheduling, and whether the CIF exists is configured through high-level signaling.

6. The method according to claim 1, further comprising:
configuring a number of the cell index of the SCell for scheduling the primary cell as a preset number.

7. The method according to claim 6, wherein the preset number is 1.

8. The method according to claim 1, wherein the configuring whether the primary cell is allowed to be cross-carrier scheduled by the SCell comprises:
explicitly configuring whether the primary cell is allowed to be cross-carrier scheduled by the SCell; or,
determining whether the primary cell is allowed to be cross-carrier scheduled by the SCell according to a preset rule.

9. The method according to claim 8, wherein the preset rule comprises at least one of:
in a case where the CIF value of the primary cell used in the SCell is configured, the primary cell is allowed to be cross-carrier scheduled by the SCell, and in a case where the CIF value of the primary cell used in the SCell is not configured, the primary cell is not allowed to be cross-carrier scheduled by the SCell; and
in a case where the cell index of the SCell for scheduling the primary cell is configured, the primary cell is allowed to be cross-carrier scheduled by the SCell, and in a case where the cell index of the SCell for scheduling the primary cell is not configured, the primary cell is not allowed to be cross-carrier scheduled by the SCell.

10. The method according to claim 8, wherein the preset rule comprises at least one of:
in a case where a configured CIF value of the primary cell used in the SCell is an element within a set X of values, the primary cell is allowed to be cross-carrier scheduled by the SCell, and in a case where the configured CIF value of the primary cell used in the SCell is Y and Y is not equal to an element within the set X of values, the primary cell is not allowed to be cross-carrier scheduled by the SCell; and
in a case where a value of a configured cell index of the SCell for scheduling the primary cell is an element within a set M of values, the primary cell is allowed to be cross-carrier scheduled by the SCell, and in a case where the value of the configured cell index of the SCell for scheduling the primary cell is N and N is not equal to an element within the set M of values, the primary cell is not allowed to be cross-carrier scheduled by the SCell.

11. The method according to claim 1, further comprising:
in a case where the primary cell supports self-scheduling and being cross-carrier scheduled, determining a downlink control information (DCI) format or a type of search space for scheduling the primary cell in one of the following manners:
only configuring common search space (CSS) and user equipment (UE) specific search space (USS) bearing fallback DCI on the primary cell, wherein the USS bearing the non-fallback DCI is entirely located in the SCell for scheduling the primary cell;
configuring CSS, USS bearing fallback DCI and USS bearing non-fallback DCI on the primary cell, wherein the USS bearing non-fallback DCI is entirely or partially located in the SCell for scheduling the primary cell; and
configuring CSS bearing fallback DCI or the USS bearing fallback DCI to be partially or entirely located in the SCell for scheduling the primary cell by adding a CIF.

12. The method according to claim 11, wherein CSS or USS is partially or entirely located in the SCell for scheduling the primary cell, comprises:
configuring a scaling factor A for the CSS or the USS, to adjust a number of candidate sets of the CSS or the USS to be located on the primary cell and to adjust a number of candidate sets of the CSS or the USS to be located on the SCell for scheduling the primary cell.

13. The method according to claim 12, wherein the configuring a scaling factor A for the CSS or the USS, to adjust a number of candidate sets of the CSS or the USS to be located on the primary cell and to adjust a number of candidate sets of the CSS or the USS to be located on the SCell for scheduling the primary cell comprises:
the number of candidate sets on the primary cell remains unchanged, and the number of candidate sets on the SCell for scheduling the primary cell is A*M (L); or,
the number of candidate sets on the primary cell is A*M (L), and the number of candidate sets on the SCell for scheduling the primary cell is M (L)-A*M (L); or,
the number of candidate sets on the SCell for scheduling the primary cell is A*M (L), and the number of candidate sets on the primary cell is M (L)-A*M (L);
wherein, M (L) is a number of candidate sets for an aggregation level L comprised in the CSS or comprised in the USS.

14. A device, comprising: a memory and at least one processor;
wherein the memory is configured to store at least one program; and
the at least one processor, when executing the at least one program, performs:
configuring cross-carrier scheduling configuration information of a cell, such that the primary cell supports self-scheduling and being cross-carrier scheduled by a secondary cell (SCell);
wherein in a case where the cell is the primary cell, the configuring cross-carrier scheduling configuration information of a cell comprises one of the following:
configuring scheduling cell information of the primary cell as being cross-carrier scheduled, and configuring a cell index of the SCell for scheduling the primary cell and a carrier indicator field (CIF) value of the primary cell used in the SCell; or,
configuring the scheduling cell information of the primary cell as self-scheduling and being cross-carrier scheduled, and configuring whether a CIF exists in the primary cell, the cell index of the SCell for scheduling the primary cell and a CIF value of the primary cell used in the SCell; or,
configuring the scheduling cell information of the primary cell as self-scheduling, configuring whether the primary cell is allowed to be cross-carrier scheduled by the SCell, and in a case where the primary cell is allowed to be cross-carrier scheduled by the SCell, configuring the cell index of the SCell for scheduling the primary cell and the CIF value of the primary cell used in the SCell; and,
wherein in a case where the cell is the SCell, the configuring cross-carrier scheduling configuration information of a cell comprises:
configuring scheduling cell information of the SCell as self-scheduling, configuring whether the SCell is allowed to schedule the primary cell, and in a case where the SCell is allowed to schedule the primary cell, configuring the CIF value of the primary cell used in the SCell.

15. A non-transitory computer-readable storage medium storing computer programs, wherein the computer programs, when executed by a processor, perform:
configuring cross-carrier scheduling configuration information of a cell, such that the primary cell supports self-scheduling and being cross-carrier scheduled by a secondary cell (SCell);
wherein in a case where the cell is the primary cell, the configuring cross-carrier scheduling configuration information of a cell comprises one of the following:
configuring scheduling cell information of the primary cell as being cross-carrier scheduled, and configuring a cell index of the SCell for scheduling the primary cell and a carrier indicator field (CIF) value of the primary cell used in the SCell; or,
configuring the scheduling cell information of the primary cell as self-scheduling and being cross-carrier scheduled, and configuring whether a CIF exists in the primary cell, the cell index of the SCell for scheduling the primary cell and a CIF value of the primary cell used in the SCell; or,
configuring the scheduling cell information of the primary cell as self-scheduling,
configuring whether the primary cell is allowed to be cross-carrier scheduled by the SCell, and in a case where the primary cell is allowed to be cross-carrier scheduled by the SCell, configuring the cell index of the SCell for scheduling the primary cell and the CIF value of the primary cell used in the SCell; and
wherein in a case where the cell is the SCell, the configuring cross-carrier scheduling configuration information of a cell comprises:
configuring scheduling cell information of the SCell as self-scheduling, configuring whether the SCell is allowed to schedule the primary cell, and in a case where the SCell is allowed to schedule the primary cell, configuring the CIF value of the primary cell used in the SCell.

* * * * *